US009625749B2

(12) United States Patent
Lee

(10) Patent No.: US 9,625,749 B2
(45) Date of Patent: Apr. 18, 2017

(54) DISPLAY DEVICE WITH IMPROVED COUPLING BETWEEN COMPONENTS

(71) Applicant: Samsung Display Co., Ltd., Yongin, Gyeonggi-Do (KR)

(72) Inventor: Dong-Cheol Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 140 days.

(21) Appl. No.: 14/578,664

(22) Filed: Dec. 22, 2014

(65) Prior Publication Data

US 2015/0253614 A1    Sep. 10, 2015

(30) Foreign Application Priority Data

Mar. 7, 2014 (KR) .................. 10-2014-0027259

(51) Int. Cl.
 *F21V 7/04* (2006.01)
 *G02F 1/1333* (2006.01)
 *F21V 8/00* (2006.01)

(52) U.S. Cl.
 CPC ..... *G02F 1/133308* (2013.01); *G02B 6/0081* (2013.01); *G02B 6/0088* (2013.01); *G02F 2001/133314* (2013.01)

(58) Field of Classification Search
 CPC .......... G02F 1/33308; G02F 1/133308; G02F 2001/133314; G02B 6/081; G02B 6/0088
 USPC ........................................ 362/633
 See application file for complete search history.

(56) References Cited

U.S. PATENT DOCUMENTS

| 2006/0044746 | A1  | 3/2006  | Kim et al. |
| 2008/0303971 | A1* | 12/2008 | Lee ............... G02F 1/133308 349/58 |
| 2011/0215685 | A1  | 9/2011  | Jarvis et al. |
| 2011/0261281 | A1  | 10/2011 | Liu et al. |
| 2012/0002130 | A1  | 1/2012  | Watanabe |
| 2012/0169958 | A1* | 7/2012  | Lee ............... G02F 1/133308 349/58 |
| 2012/0327633 | A1  | 12/2012 | Jang |

FOREIGN PATENT DOCUMENTS

| JP | 2009-020229 A  | 1/2009 |
| KR | 20-0441581 Y1  | 8/2008 |
| KR | 10-1109077 B1  | 1/2012 |

* cited by examiner

*Primary Examiner* — Anh Mai
*Assistant Examiner* — Hana Featherly
(74) *Attorney, Agent, or Firm* — Cantor Colburn LLP

(57) ABSTRACT

A display device includes a display panel and a backlight unit including a bottom chassis including a bottom portion and a side wall, the bottom portion of the bottom chassis including a first bottom portion disposed in a corner portion of the bottom portion and including a first bottom side surface and a second bottom side surface, and a second bottom portion connected to the first bottom portion, the first bottom side surface of the first bottom portion including a first sub-bottom side surface and a second sub-bottom side surface including a third sub-bottom side surface and a fourth sub-bottom side, where the side wall of the bottom chassis is connected perpendicularly to the bottom portion and exposes at least one of the second sub-bottom side surface and the fourth sub-bottom side surface.

17 Claims, 15 Drawing Sheets

DISPLAY DEVICE WITH IMPROVED COUPLING BETWEEN COMPONENTS

This application claims priority to Korean Patent Application No. 10-2014-0027259, filed on Mar. 7, 2014, and all the benefits accruing therefrom under 35 U.S.C. §119, the disclosure of which is hereby incorporated by reference in its entirety.

BACKGROUND

1. Field

The exemplary embodiments relate to a display device and, more particularly, to a display device capable of improving coupling force between its components.

2. Description of the Related Art

Generally, a flat display device includes a display panel for displaying an image, a backlight unit for supplying light to the display panel, a bottom chassis receiving the backlight unit, and a top chassis coupled to the bottom chassis to cover a peripheral portion (i.e., an edge portion) of the display panel.

A mold frame is disposed between the bottom chassis and the top chassis. The mold frame may effectively prevent the backlight unit from being separated from the bottom chassis and may support the display panel. The top chassis is coupled to the bottom chassis to effectively prevent the display panel from being separated from the mold frame.

Recently, since a narrow bezel structure has been applied to a display device to effectively reduce a size of a peripheral portion of the display device, coupling forces between the bottom chassis, the mold frame, and the top chassis have been reduced. Various researches are being conducted for increasing the coupling force and reducing defects.

SUMMARY

Exemplary embodiments of the invention may provide a display device capable of improving coupling force between its components and of reducing defects.

According to exemplary embodiments of the invention, a display device includes a display panel and a backlight unit. The display panel displays an image. The backlight unit is disposed under the display panel to provide light to the display panel. The backlight unit includes a bottom chassis including a bottom portion and a side wall.

In an exemplary embodiment, the bottom portion of the bottom chassis may include a first bottom portion and a second bottom portion. The first bottom portion may be disposed in a corner portion of the bottom portion and may include a first bottom side surface and a second bottom side surface perpendicular to the first bottom side surface. The second bottom portion is connected to the first bottom portion.

In an exemplary embodiment, the first bottom side surface of the first bottom portion includes a first sub-bottom side surface connected to the second bottom portion, and a second sub-bottom side surface connected or parallel to the first sub-bottom side surface and spaced apart from the second bottom portion.

In an exemplary embodiment, the second bottom side surface of the first bottom portion includes a third sub-bottom side surface connected to the second bottom portion, and a fourth sub-bottom side surface spaced apart from the second bottom portion and connected perpendicularly to the second sub-bottom side surface.

In an exemplary embodiment, the side wall of the bottom chassis is connected perpendicularly to the bottom portion and exposes at least one of the second sub-bottom side surface and the fourth sub-bottom side surface.

In an exemplary embodiment, the first bottom portion may be provided in plurality in the bottom portion.

In an exemplary embodiment, the side wall of the bottom chassis may include a first side wall connected perpendicularly to the first bottom portion, and a second side wall connected perpendicularly to the second bottom portion.

In an exemplary embodiment, the first side wall may include a first sub-side wall connected perpendicularly to at least a portion of the first sub-bottom side surface, and a second sub-side wall connected perpendicularly to at least a portion of the second sub-bottom side surface.

In an exemplary embodiment, each of heights of the first and second sub-side walls may be lower than a height of the second side wall.

In an exemplary embodiment, a height of the first sub-side wall may be equal to a height of the second sub-side wall.

In an exemplary embodiment, the first sub-side wall may be spaced apart from the second side wall.

In an exemplary embodiment, the first sub-side wall may be spaced apart from the second sub-side wall.

In an exemplary embodiment, at least one of the first sub-side wall and the second sub-side wall may be provided in plurality.

In an exemplary embodiment, the first sub-bottom side surface may be spaced apart from the second sub-bottom side surface of the first bottom portion when viewed from a plan view.

In an exemplary embodiment, the second bottom portion may include a first bottom side surface parallel to the first bottom side surface of the first bottom portion, and a second bottom side surface parallel to the first bottom side surface of the second bottom portion. A shortest distance between the first bottom side surface of the second bottom portion and the first bottom side surface of the first bottom portion may be shorter than a shortest distance between the first and second bottom side surfaces of the second bottom portion when viewed from a plan view.

In an exemplary embodiment, the third sub-bottom side surface may be spaced apart from the fourth sub-bottom side surface when viewed from a plan view.

In an exemplary embodiment, the second bottom portion may include a third bottom side surface parallel to the second bottom side surface of the first bottom portion, and a fourth bottom side surface parallel to the third bottom side surface. A shortest distance between the third bottom side surface of the second bottom portion and the second bottom side surface of the first bottom portion may be shorter than a shortest distance between the third and fourth bottom side surfaces of the second bottom portion when viewed from a plan view.

In an exemplary embodiment, the first side wall may further include a third sub-side wall connected perpendicularly to at least a portion of the third sub-bottom side surface.

In an exemplary embodiment, a height of the third sub-side wall may be lower than a height of the second side wall.

In an exemplary embodiment, the third sub-side wall may be spaced apart from the second side wall.

In an exemplary embodiment, the third sub-side wall may be provided in plurality.

In an exemplary embodiment, the first side wall may include a first sub-side wall connected perpendicularly to at least a portion of the first sub-bottom side surface, and a fourth sub-side wall connected to perpendicularly to at least a portion of the fourth sub-bottom side surface. The first side wall may expose the second sub-bottom side surface and the third sub-bottom side surface.

In an exemplary embodiment, a height of the fourth sub-side wall may be lower than a height of the second side wall.

In an exemplary embodiment, the fourth sub-side wall may be provided in plurality.

In an exemplary embodiment, the display device may further include a mold frame covering at least a portion of the side wall of the bottom chassis and disposed between the display panel and the backlight unit to support the display panel.

BRIEF DESCRIPTION OF THE DRAWINGS

The above and other exemplary embodiments, advantages and features of this disclosure will become more apparent by describing in further detailed description in view of the attached drawings, in which.

DETAILED DESCRIPTION

Figure 1:
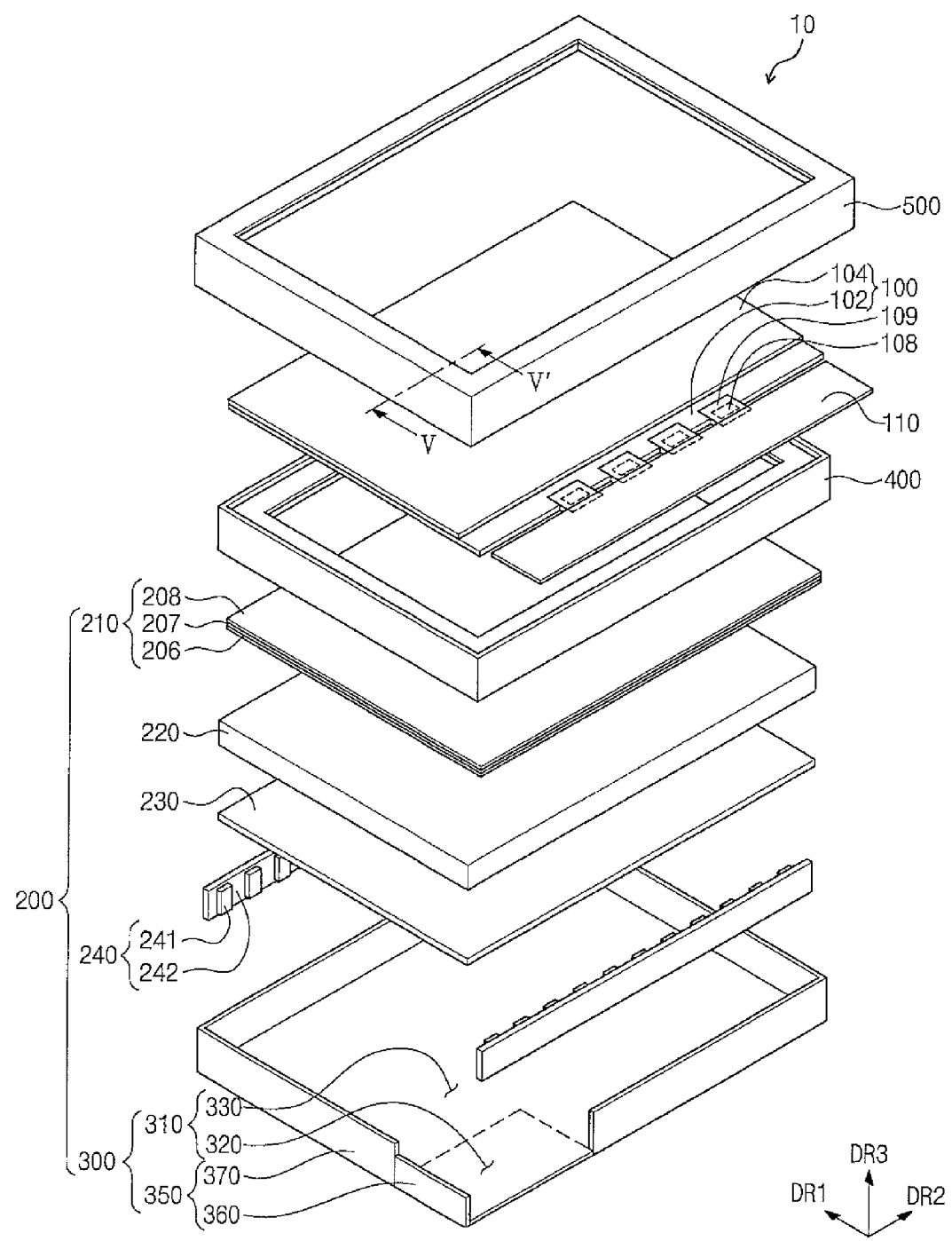
FIG. 1 is an exploded perspective view showing exemplary embodiments of a display device according to the invention.

The invention will now be described more fully hereinafter with reference to the accompanying drawings, in which exemplary embodiments of the invention are shown. The advantages and features of the invention and methods of achieving them will be apparent from the following exemplary embodiments that will be described in more detail with reference to the accompanying drawings. It should be noted, however, that the invention is not limited to the following exemplary embodiments, and may be implemented in various forms. Accordingly, the exemplary embodiments are provided only to disclose the invention and let those skilled in the art know the category of the invention. In the drawings, exemplary embodiments of the invention are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the exemplary embodiment in the detailed description will be described with sectional views as ideal exemplary views of the invention. Accordingly, shapes of the exemplary views may be modified according to manufacturing techniques and/or allowable errors. Therefore, the embodiments of the invention are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the invention.

It will be also understood that although the terms first, second, third etc. may be used herein to describe various elements, these elements should not be limited by these terms. These terms are only used to distinguish one element from another element. Thus, a first element in exemplary embodiments could be termed a second element in other exemplary embodiments without departing from the teachings of the invention. Exemplary embodiments of exemplary embodiments of the invention explained and illustrated herein include their complementary counterparts. The same reference numerals or the same reference designators denote the same elements throughout the specification.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. In an exemplary embodiment, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 2:
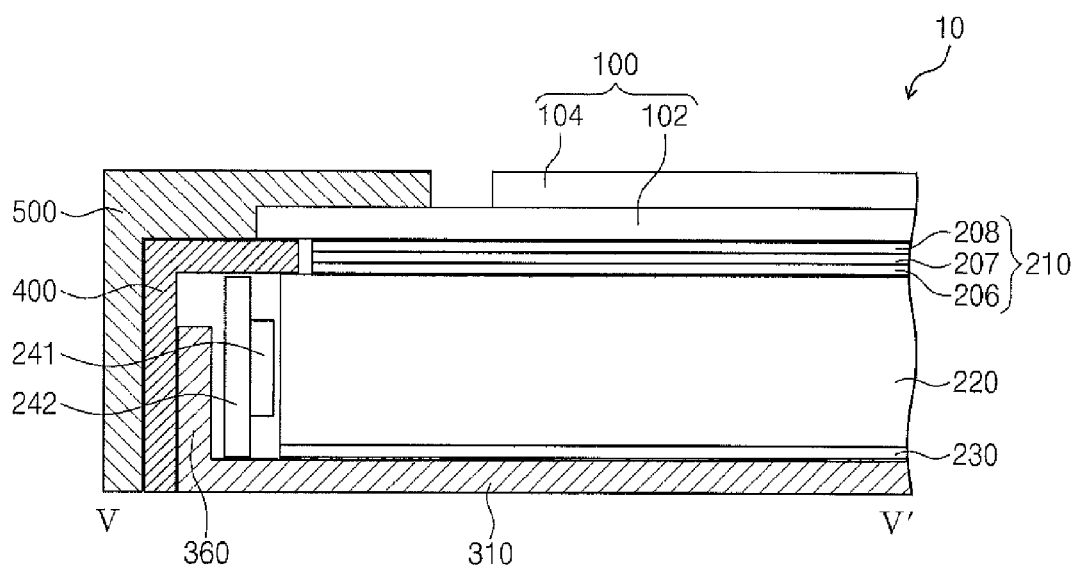
FIG. 2 is a cross-sectional view taken along line V-V' of FIG. 1.

FIG. 1 is an exploded perspective view showing a display device according to exemplary embodiments of the invention. FIG. 2 is a cross-sectional view taken along line V-V' of FIG. 1.

Referring to FIGS. 1 and 2, a display device 10 includes a display panel 100, a backlight unit 200, a mold frame 400, and a top chassis 500.

A short axis direction of the display device 10 is defined as a first direction (e.g., a direction DR1 of FIG. 1), and a long axis direction of the display device 10 is defined as a second direction (e.g., a direction DR2 of FIG. 1) perpendicular to the first direction (e.g., the direction DR1 of FIG. 1). The backlight unit 200, the mold frame 400, the display panel 100, and the top chassis 500 are sequentially stacked in a third direction (e.g., a direction DR3 of FIG. 1) perpendicular to the first and second directions (e.g., the directions DR1 and DR2 of FIG. 1).

The display panel 100 may be a non-illuminant display panel requiring an additional backlight unit 200, not a self-emitting display panel (e.g., an organic light emitting display panel). In an exemplary embodiment, the display panel 100 may be one of various display panels such as a liquid crystal display ("LCD") panel and an electrophoretic display panel ("EDP"). In the embodiment, the LCD panel will be described as an example.

The display panel 100 displays an image. The display panel 100 may include a display area displaying the image and a non-display area not displaying the image.

The display panel 100 includes a first substrate 102, a second substrate 104 opposite and coupled to the first substrate 102, and a liquid crystal layer (not shown) disposed between the first and second substrates 102 and 104.

A plurality of pixels may be provided in a matrix form on the first substrate 102. Each of the pixels may include a gate line (not shown) extending in the first direction (e.g., the direction DR1 of FIG. 1), a data line (not shown) extending in the second direction (e.g., the direction DR2 of FIG. 1), and a pixel electrode (not shown). The data line (not shown) is insulated from and intersects the gate line (not shown). In an exemplary embodiment, a thin film transistor ("TFT") (not shown) is provided in each of the pixels. The TFT (not shown) is connected to the gate line (not shown), the data line (not shown), and the pixel electrode (not shown).

Red, green and blue ("RGB") pixels (not shown) corresponding to color pixels and a common electrode (not shown) facing the pixel electrode (not shown) are disposed on the second substrate 104. In an alternative exemplary embodiment, the color pixels (not shown) and the common electrode (not shown) may be provided on the first substrate 102. Since liquid crystal molecules of the liquid crystal layer (not shown) are arranged according to a magnitude of an electric field generated between the pixel electrode (not shown) and the common electrode (not shown), a transmittance of light provided from the backlight unit 200 may be controlled to display the image having a desired gradation.

A driving chip 108 may be provided at a side of the first substrate 102. The driving chip 108 may apply a data signal to the data line (not shown). The driving chip 108 generates the data signal applied to the data line (not shown) in response to an external signal. The external signal is a signal supplied from a printed circuit board ("PCB") 110. The external signal may include image signals, various control signals, and a driving voltage.

A gate driving circuit (not shown) may be disposed on another side of the first substrate 102 by thin-film processes. The gate driving circuit (not shown) may apply a gate signal to the gate line (not shown). Thus, the gate driving circuit (not shown) may be disposed within the display panel 100.

As described above, the display device 10 may further include the driving chip 108 providing driving signals to the display panel 100 and the PCB 110 electrically connected to the display panel 100.

In other exemplary embodiments, the driving chip 108 may include two or more chips (e.g., a data driving chip and a gate driving chip) separated from each other and may be mounted on the first substrate 102 by a chip-on-glass ("COG") process.

The PCB 110 may be electrically connected to the display panel 100 through a plurality of tape carrier packages ("TCP") 109. The driving chips 108 may be mounted on the tape carrier packages 109. The tape carrier packages 109 may be bent to wrap a side surface of a bottom chassis 300.

The PCB 110 connected to the tape carrier packages 109 may be disposed in a lower portion of the bottom chassis 300. In this case, the display device 10 may further include a shield case (not shown) that is disposed in the lower portion of the bottom chassis 300 to protect the PCB 110.

The backlight unit 200 supplies light to the display panel 100. The backlight unit 200 may include a light source unit 240 and a light guide plate 220. The light source unit 240 supplies light the light guide plate 220. The light source unit 240 may include at least one light source 241 and a circuit board 242. The at least one light source 241 may be mounted on one surface of the circuit board 242, and the circuit board 242 may apply a power to the at least one light source 241.

The light guide plate 220 guides the light provided from the light source unit 240 to output the guided light. In an exemplary embodiment, the circuit board 242 may have a plate shape, for example. In an exemplary embodiment, the light source unit 240 may include a plurality of light emitting diodes ("LEDs"). The plurality of LEDs may be arranged in the second direction (e.g., the direction DR2 of FIG. 1) on the circuit board 242 and may be spaced apart from each other. The plurality of the LEDs may correspond to the light sources 241.

The backlight unit 200 may further include an optical member 210 disposed between the light guide plate 220 and the display panel 100 and a reflection sheet 230 disposed under the light guide plate 220.

The optical member 210 improves brightness and a viewing angle of light outputted to an output surface of the display device 10. The optical member 210 may include a first optical sheet 206, a second optical sheet 207 and a third optical sheet 208 which are sequentially stacked, as shown in FIG. 2.

In an exemplary embodiment, the first optical sheet 206 may be a diffusion sheet diffusing light outputted from the light guide plate 210, for example. In an exemplary embodiment, the second optical sheet 207 may be a prism sheet that condenses the light diffused by the diffusion sheet in a direction perpendicular to a plane of the display panel 100 disposed on the second optical sheet 207, for example. In an exemplary embodiment, the third optical sheet 208 may be a protection sheet protecting the prism sheet from an external impact, for example. Any one of the first to third optical sheets 206, 207 and 208 may be provided in plurality in the optical member 210. In other exemplary embodiments, any one of the first to third optical sheets 206, 207 and 208 may be omitted when needed.

The reflection sheet 230 may reflect light leaking from a reflection surface toward the light guide plate 220. The reflection sheet 230 includes a material capable of reflecting light.

The mold frame 400 is disposed between the display panel 100 and the backlight unit 200 to support the display panel 100. The mold frame 400 will be described in further detail later.

The backlight unit 200 includes the bottom chassis 300.

The top chassis 500 is opposite and coupled to the bottom chassis 300. The top chassis 500 may cover an edge of the display panel 100.

Figure 3:
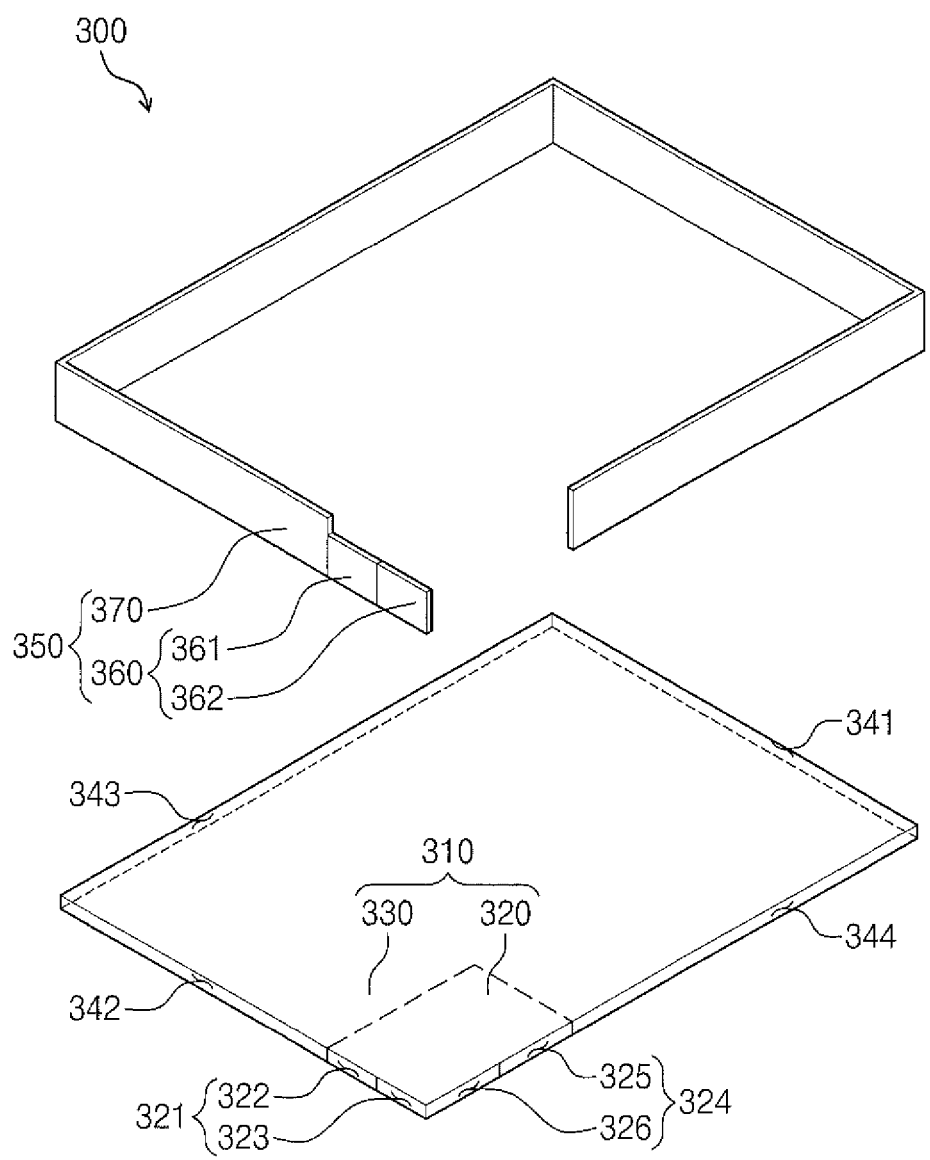
FIG. 3 is an exploded perspective view showing exemplary embodiments of a bottom chassis included in a display device according to the invention.

FIG. 3 is an exploded perspective view showing a bottom chassis included in a display device according to exemplary embodiments of the invention.

Referring to FIGS. 1 to 3, the bottom chassis 300 includes a bottom portion 310 and a side wall 350.

The bottom portion 310 may include a first bottom portion 320 and a second bottom portion 330. In an exemplary embodiment, the bottom portion 310 may have a substantially quadrilateral shape, for example.

The first bottom portion 320 may be disposed at a corner portion of the bottom portion 310. The first bottom portion 320 may include a first bottom side surface 321 and a second bottom side surface 324 perpendicular to the first bottom side surface 321. In an exemplary embodiment, the first bottom side surface 321 may be parallel to the first direction DR1 of FIG. 1, and the second bottom side surface 324 may be parallel to the second direction DR2 of FIG. 1. In an exemplary embodiment, the first bottom portion 320 may have, for example, a quadrilateral shape. However, the invention is not limited to the shape of the first bottom portion 320. The first bottom portion 320 may be provided in plurality in the bottom portion 310. In an exemplary embodiment, when the bottom portion 310 has the quadrilateral shape, the first bottom portion 320 may be disposed at each of at least two of four corner portions of the bottom portion 310.

The first bottom side surface 321 of the first bottom portion 320 includes a first sub-bottom side surface 322 and a second sub-bottom side surface 323. The first sub-bottom side surface 322 is connected to the second bottom portion 330. The second sub-bottom side surface 323 is connected or parallel to the first sub-bottom side surface 322. The second sub-bottom side surface 323 is spaced apart from the second bottom portion 330.

The second bottom side surface 324 of the first bottom portion 320 includes a third sub-bottom side surface 325 and a fourth sub-bottom side surface 326. The third sub-bottom side surface 325 is connected to the second bottom portion 330. The fourth sub-bottom side surface 326 is spaced apart from the second bottom portion 330 and is connected perpendicularly to the second sub-bottom side surface 323. The fourth sub-bottom side surface 326 may be connected or parallel to the third sub-bottom side surface 325.

Figure 4A:
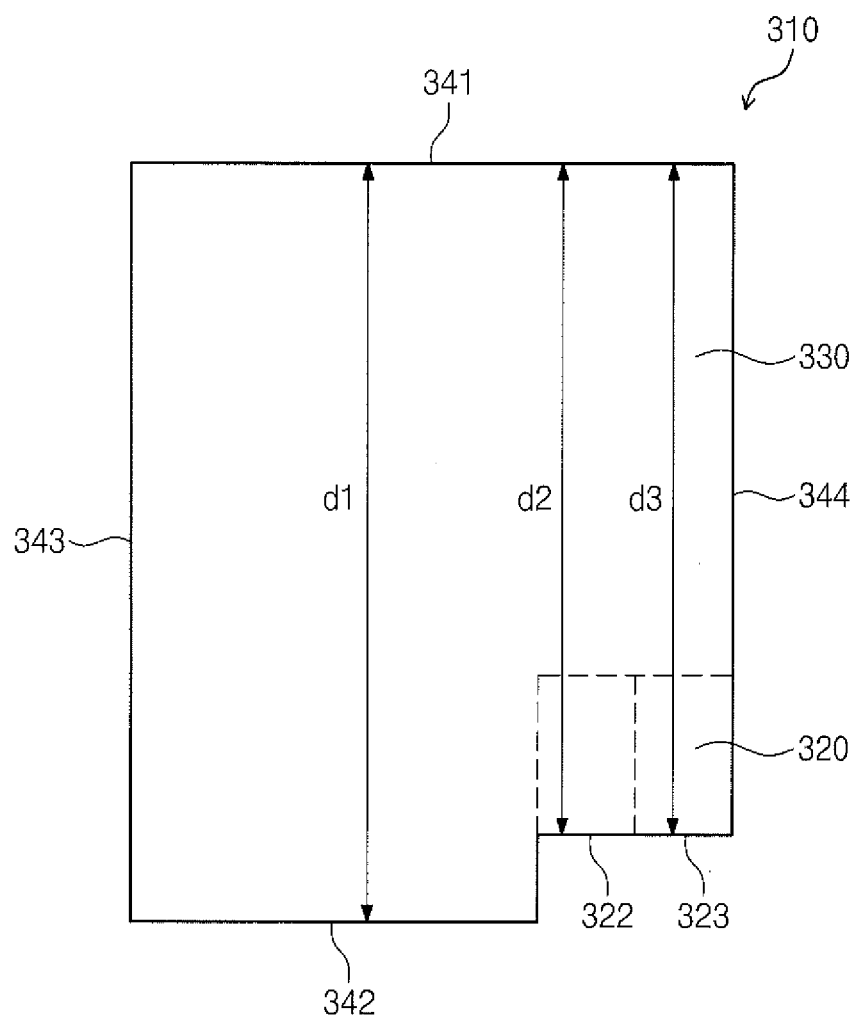
FIGS. 4A and 4B are plan views showing exemplary embodiments of a bottom portion included in a bottom chassis according to the invention.
Figure 4B:
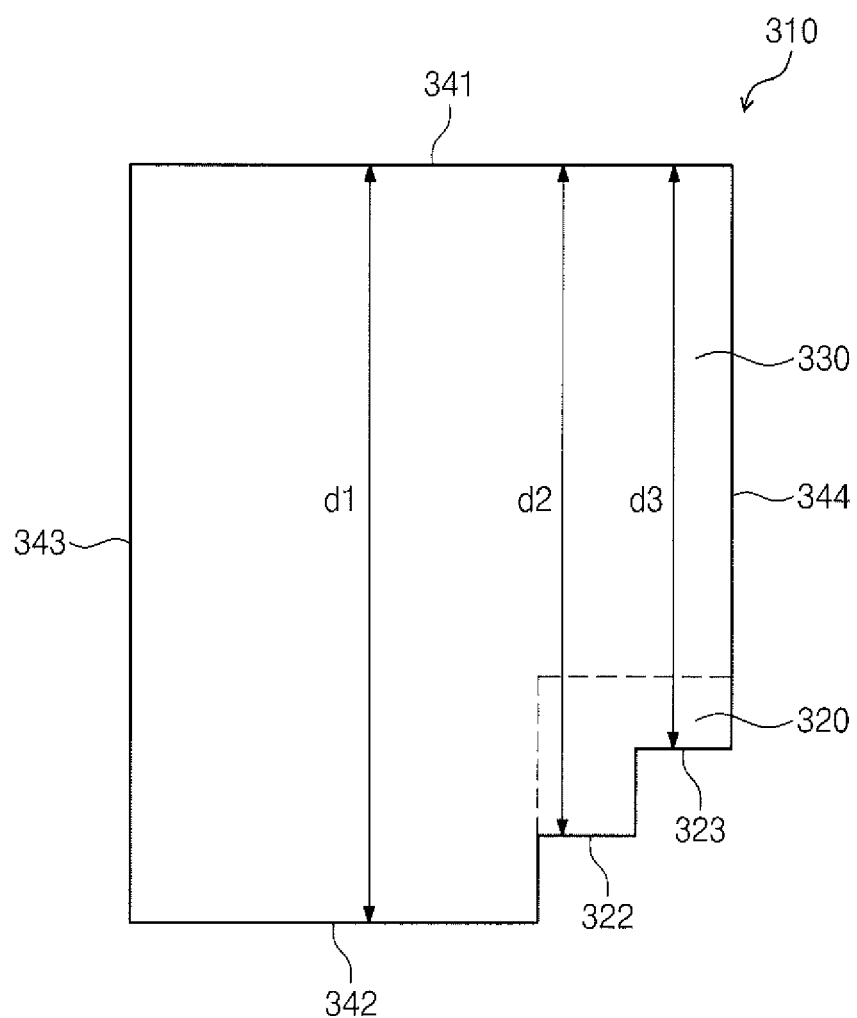

FIGS. 4A and 4B are plan views showing a bottom portion 310 included in a bottom chassis 300 according to exemplary embodiments of the invention.

Referring to FIG. 4A, the first sub-bottom side surface 322 and the second sub-bottom side surface 323 may be connected to each other when viewed from a plan view. In other words, the first sub-bottom side surface 322 and the second sub-bottom side surface 323 may be collinear when viewed from a plan view. In an exemplary embodiment, the first sub-bottom side surface 322 and the second sub-bottom side surface 323 may be parallel to each other. In an alternative exemplary embodiment, referring to FIG. 4B, the first sub-bottom side surface 322 and the second sub-bottom side surface 323 may be spaced apart from each other when viewed from a plan view. In other words, the first sub-bottom side surface 322 and the second sub-bottom side surface 323 may be disposed on different lines (i.e., non-collinear) when viewed from a plan view.

Figure 5A:
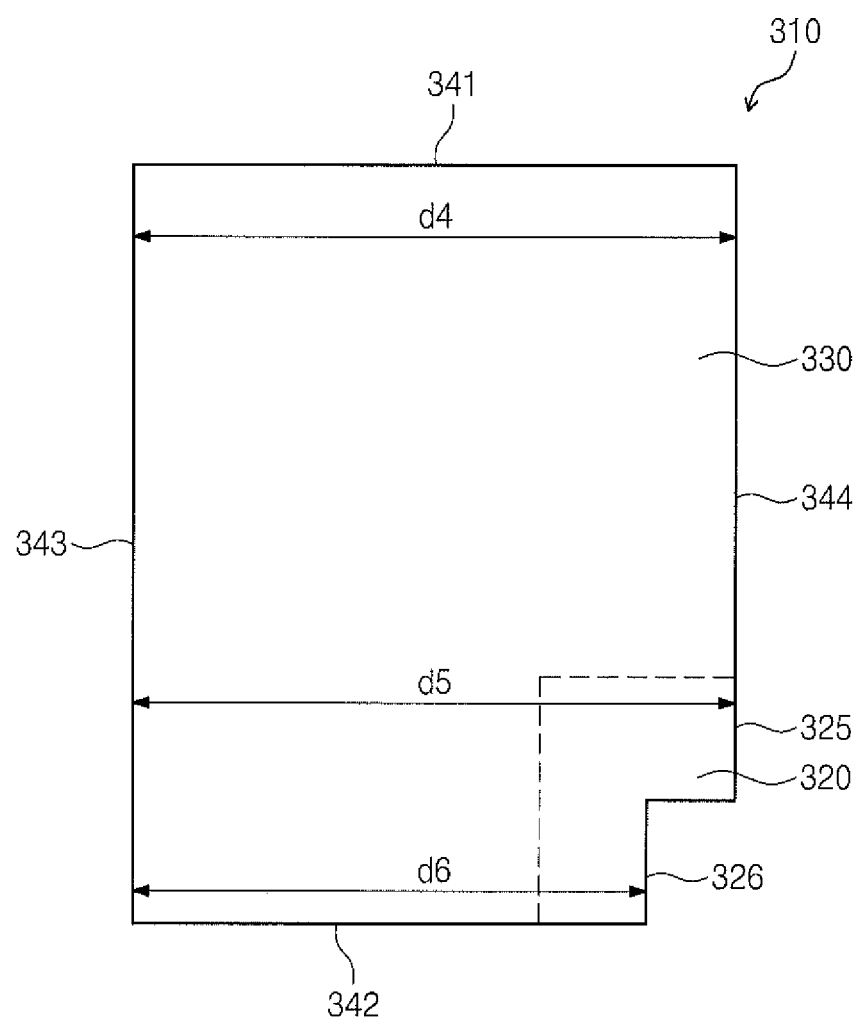
FIGS. 5A and 5B are plan views showing exemplary embodiments of a bottom portion included in a bottom chassis according to the invention.
Figure 5B:
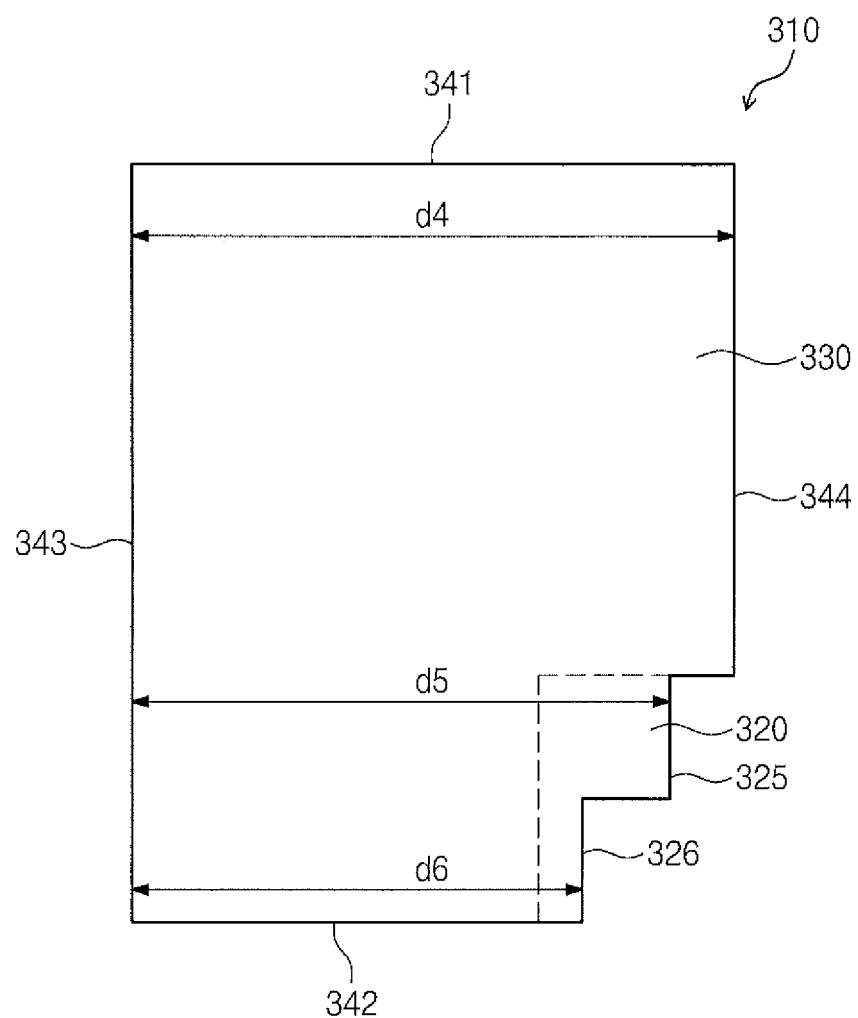

FIGS. 5A and 5B are plan views showing a bottom portion 310 included in a bottom chassis 300 according to exemplary embodiments of the invention.

Referring to FIG. 5A, the third sub-bottom side surface 325 and the fourth sub-bottom side surface 326 may be spaced apart from each other when viewed from a plan view. The third sub-bottom side surface 325 and a fourth bottom side surface 344 of the second bottom portion 330 may be collinear when viewed from a plan view. Referring to FIG. 5B, when viewed from a plan view, the third sub-bottom side surface 325 and the fourth sub-bottom side surface 326 may be spaced apart from each other and the third sub-bottom side surface 325 may also be spaced apart from the fourth bottom side surface 344 of the second bottom portion 330. The third sub-bottom side surface 325 and the fourth sub-bottom side surface 326 may be disposed on different lines (i.e., non-collinear) when viewed from a plan view.

Referring again to FIGS. 1 to 3, the second bottom portion 330 is connected to the first bottom portion 320. In an exemplary embodiment, the second bottom portion 330 may be provided to surround the first bottom portion 320. In an exemplary embodiment, when the number of the first bottom portion 320 is one in the bottom portion 310, the second bottom portion 330 may be '】'-shaped, for example.

The second bottom portion 330 may include a first bottom side surface 341 and a second bottom side surface 342. The first bottom side surface 341 of the second bottom portion 330 is parallel to the first bottom side surface 321 of the first bottom portion 320. The second bottom side surface 342 of the second bottom portion 330 is parallel to the first bottom side surface 341 of the second bottom portion 330. The second bottom side surface 342 of the second bottom portion 330 and the first bottom side surface 321 of the first bottom portion 320 may provide one side surface of the bottom portion 310.

The second bottom side surface 342 of the second bottom portion 330 and the first bottom side surface 321 of the first bottom portion 320 may be collinear when viewed from a plan view. In this case, the shortest distance between the first bottom side surface 341 of the second bottom portion 330 and the first bottom side surface 321 of the first bottom portion 320 may be equal to the shortest distance (e.g., a distance d1 of FIGS. 4A and 4B) between the first bottom side surface 341 and the second bottom side surface 342 of the second bottom portion 330. The shortest distance may be a perpendicular distance between two lines parallel to each other in a plan view. In an alternative exemplary embodiment, as shown in FIG. 4A, the shortest distance (e.g., distances d2 and d3) between the first bottom side surface 341 of the second bottom portion 330 and the first bottom side surface 321 of the first bottom portion 320 may be shorter than the shortest distance (e.g., the distance d1) between the first bottom side surface 341 and the second bottom side surface 342 of the second bottom portion 330 when viewed from a plan view. In another exemplary embodiments, as shown in FIG. 4B, the shortest distance (e.g., a distance d3) between the first bottom side surface 341 of the second bottom portion 330 and the second sub-bottom side surface 323 may be shorter than the shortest distance (e.g., a distance d2) between the first bottom side surface 341 of the second bottom portion 330 and the first sub-bottom side surface 322 and the shortest distance (e.g., the distance d1) between the first bottom side surface 341 and the second bottom side surface 342 of the second bottom portion 330 when viewed from a plan view.

Referring to FIGS. 4A and 4B, the shortest distance (e.g., the distances d2 of FIGS. 4A and 4B) between the first bottom side surface 341 of the second bottom portion 330 and the first sub-bottom side surface 322 may be equal to or different from the shortest distance (e.g., the distances d3 of FIGS. 4A and 4B) between the first bottom side surface 341 of the second bottom portion 330 and the second sub-bottom side surface 323. In FIG. 4B, the shortest distance (e.g., the distance d2) between the first bottom side surface 341 of the second bottom portion 330 and the first sub-bottom side surface 322 is longer than the shortest distance (e.g., the distance d3) between the first bottom side surface 341 of the second bottom portion 330 and the second sub-bottom side surface 323. However, the invention is not limited thereto. In other exemplary embodiments, the shortest distance (e.g., the distance d2) between the first bottom side surface 341 of the second bottom portion 330 and the first sub-bottom side surface 322 may be shorter than the shortest distance (e.g., the distance d3) between the first bottom side surface 341 of the second bottom portion 330 and the second sub-bottom side surface 323.

Referring again to FIGS. 1 to 3, the second bottom portion 330 may also have a third bottom side surface 343 and a fourth bottom side surface 344. The third bottom side surface 343 of the second bottom portion 330 is parallel to the second bottom side surface 324 of the first bottom portion 320. The fourth bottom side surface 344 is parallel to the third bottom side surface 343. The fourth bottom side surface 344 of the second bottom portion 330 and the second bottom side surface 324 of the first bottom portion 320 may provide another side surface of the bottom portion 310.

The fourth bottom side surface 344 of the second bottom portion 330 and the second bottom side surface 324 of the first bottom portion 320 may be collinear in a plan view. In this case, the shortest distance between the third bottom side surface 343 of the second bottom portion 330 and the second bottom side surface 324 of the first bottom portion 320 may be equal to the shortest distance (e.g., a distance d4 of FIGS. 5A and 5B) between the third bottom side surface 343 and the fourth bottom side surface 344 of the second bottom portion 330. In an alternative exemplary embodiment, referring to FIG. 5A, the shortest distance (e.g., a distance d6) between the third bottom side surface 343 of the second bottom portion 330 and the fourth sub-bottom side surface 326 of the first bottom portion 320 may be shorter than the shortest distance (e.g., the distance d4) between the third bottom side surface 343 and the fourth bottom side surface 344 of the second bottom portion 330 when viewed from a plan view. In another exemplary embodiment, as shown in FIG. 5B, the shortest distance (e.g., a distance d6) between the third bottom side surface 343 of the second bottom portion 330 and the fourth sub-bottom side surface 326 may be shorter than the shortest distance (e.g., a distance d5) between the third bottom side surface 343 of the second bottom portion 330 and the third sub-bottom side surface 325 and the shortest distance (e.g., the distance d4) between the third bottom side surface 343 and the fourth bottom side surface 344 of the second bottom portion 330 when viewed from a plan view.

Referring to FIGS. 3, 5A and 5B, the shortest distance (e.g., the distance d5 of FIG. 5A or 5B) between the third bottom side surface 343 of the second bottom portion 330 and the third sub-bottom side surface 325 may be equal to or different from the shortest distance (e.g., the distance d6 of FIG. 5A or 5B) between the third bottom side surface 343 of the second bottom portion 330 and the fourth sub-bottom side surface 326. In FIG. 5B, the shortest distance (e.g., the distance d5) between the third bottom side surface 343 of the second bottom portion 330 and the third sub-bottom side surface 325 is longer than the shortest distance (e.g., the distance d6) between the third bottom side surface 343 of the second bottom portion 330 and the fourth sub-bottom side surface 326. However, the invention is not limited thereto. In other exemplary embodiments, the shortest distance (e.g., the distance d5) between the third bottom side surface 343 of the second bottom portion 330 and the third sub-bottom side surface 325 may be shorter than the shortest distance (e.g., the distance d6) between the third bottom side surface 343 of the second bottom portion 330 and the fourth sub-bottom side surface 326.

Referring again to FIGS. 1 to 3, the side wall 350 of the bottom chassis 300 is connected perpendicularly to the bottom portion 310. In an exemplary embodiment, the side wall 350 of the bottom chassis 300 may extend from side surfaces of the bottom portion 310 in the direction DR3 of FIG. 1. The side wall 350 of the bottom chassis 300 exposes at least one of the second sub-bottom side surface 323 and the fourth sub-bottom side surface 326.

The side wall 350 of the bottom chassis 300 may include a first side wall 360 and a second side wall 370. The second side wall 370 may be connected perpendicularly to the second bottom portion 330.

The first side wall 360 is connected perpendicularly to the first bottom portion 320.

The first side wall 360 may include a first sub-side wall 361 and a second sub-side wall 362.

Figure 6A:
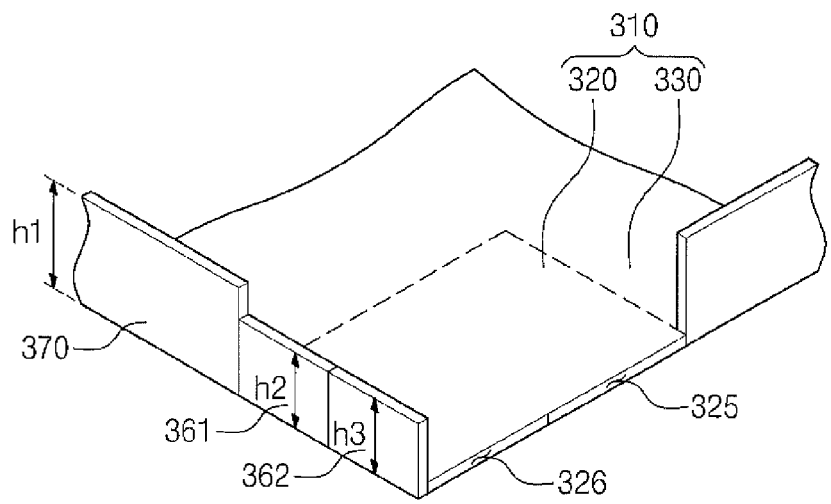
FIGS. 6A, 6B, and 6C are perspective views showing exemplary embodiments of various shapes of a bottom chassis included in a display device according to the invention.
Figure 6B:
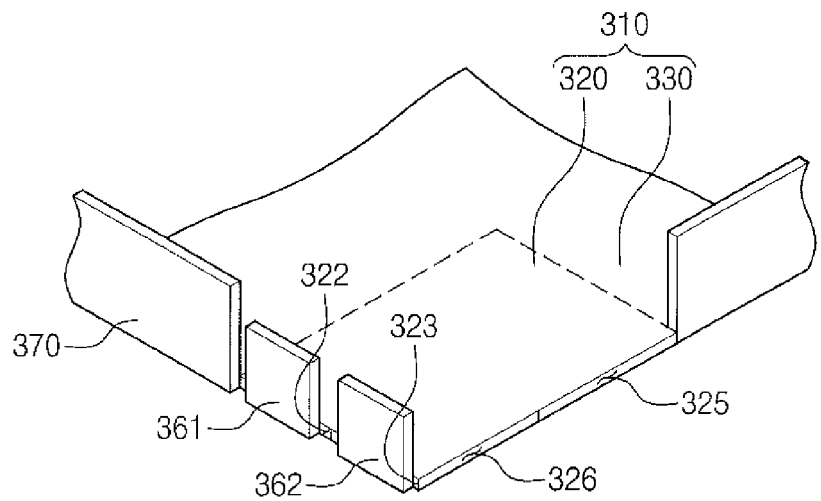
Figure 6C:
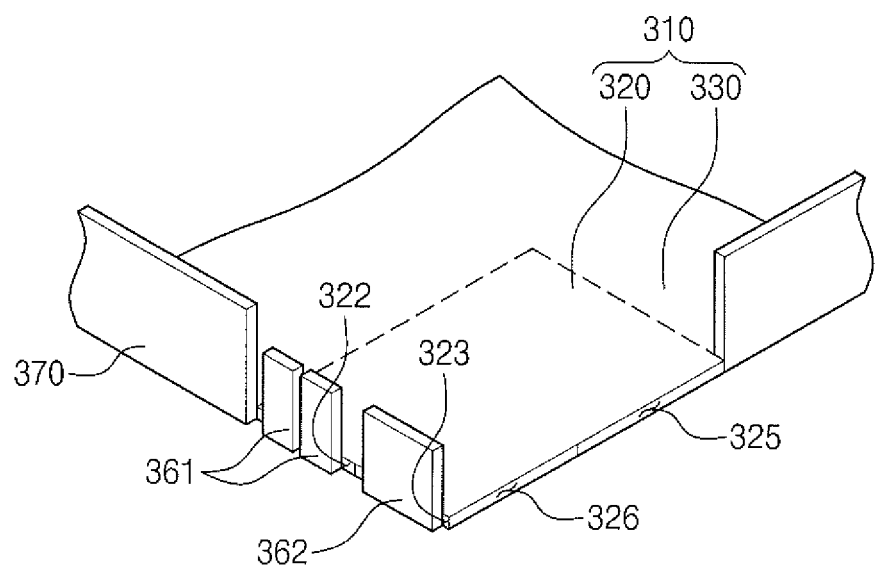

FIGS. 6A, 6B, and 6C are perspective views showing various shapes of a bottom chassis 300 included in a display device 10 according to exemplary embodiments of the invention.

Referring to FIGS. 1 to 3, 6A, 6B, and 6C, the first sub-side wall 361 may be connected perpendicularly to at least a portion of the first sub-bottom side surface 322. In an exemplary embodiment, the first sub-side wall 361 may extend from at least a portion of the first sub-bottom side surface 322 in the direction DR3 of FIG. 1. Referring to FIG. 6A, the first sub-side wall 361 may be connected perpendicularly to an entire portion of the first sub-bottom side surface 322. In the exemplary embodiment, the first sub-side wall 361 may extend from the entire portion of the first sub-bottom side surface 322 in the direction DR3 of FIG. 1. In an alternative exemplary embodiment, as shown in FIG. 6B, the first sub-side wall 361 may be connected perpendicularly to a portion of the first sub-bottom side surface 322. In the exemplary embodiment, the first sub-side wall 361 may extend from the portion of the first sub-bottom side surface 322 in the direction DR3 of FIG. 1.

The first sub-side wall 361 may be connected to or spaced apart from one end of the second side wall 370. Referring to FIG. 6A, the first sub-side wall 361 may be connected to one end of the second side wall 370. In an alternative exemplary embodiment, as shown in FIGS. 6B and 6C, first sub-side wall 361 may be spaced apart from one end of the second side wall 370.

In exemplary embodiments, the first sub-side wall 361 may be provided in plurality. As shown in FIG. 6A, the number of the first sub-side wall 361 may be one. In an alternative exemplary embodiment, as shown in FIG. 6C, the first sub-side wall 361 may be provided in plurality.

A height h2 of the first sub-side wall 361 may be lower than a height h1 of the second side wall 370, as shown in FIGS. 6A, 6B, and 6C. In an alternative exemplary embodiment, the height h2 of the first sub-side wall 361 may be equal to the height h1 of the second side wall 370.

Referring to FIGS. 1 to 3, 6A, 6B, and 6C, the second sub-side wall 362 may be connected perpendicularly to at least a portion of the second sub-bottom side surface 323. In an exemplary embodiment, the second sub-side wall 362 may extend from at least a portion of the second sub-bottom side surface 323 in the direction DR3 of FIG. 1. Referring to FIG. 6A, the second sub-side wall 362 may be connected perpendicularly (e.g., the direction DR3 of FIG. 1) to an entire portion of the second sub-bottom side surface 323. In an alternative exemplary embodiment, the second sub-side wall 362 may be connected perpendicularly (e.g., the direction DR3 of FIG. 1) to a portion of the second sub-bottom side surface 323, as shown in FIGS. 6B and 6C.

The second sub-side wall 362 may be connected to or spaced apart from the first sub-side wall 361. Referring to FIG. 6A, the second sub-side wall 362 may be connected to the first sub-side wall 361. In an alternative exemplary embodiment, the second sub-side wall 362 may be spaced apart from the first sub-side wall 361, as shown in FIGS. 6B and 6C.

In the illustrated exemplary embodiment, the number of the second sub-side wall 362 is one in FIGS. 6A, 6B, and 6C. However, the invention is not limited thereto. In other exemplary embodiments, the second sub-side wall 362 may be provided in plurality.

A height h3 of the second sub-side wall 362 may be lower than the height h1 of the second side wall 370. FIGS. 6A, 6B, and 6C show the second sub-side wall 362 having the height h3 lower than the height h1 of the second side wall 370 as an example. However, the invention is not limited thereto. In other exemplary embodiments, the height h3 of the second sub-side wall 362 may be equal to the height h1 of the second side wall 370.

In the illustrated exemplary embodiment, the height h3 of the second sub-side wall 362 may be equal to the height h2 of the first sub-side wall 361, as shown in FIGS. 6A, 6B, and 6C. However, the invention is not limited thereto. In other exemplary embodiments, the height h3 of the second sub-side wall 362 may be different from the height h2 of the first sub-side wall 361. In other words, the height h3 of the second sub-side wall 362 may be lower or higher than the height h2 of the first sub-side wall 361.

Figure 7A:
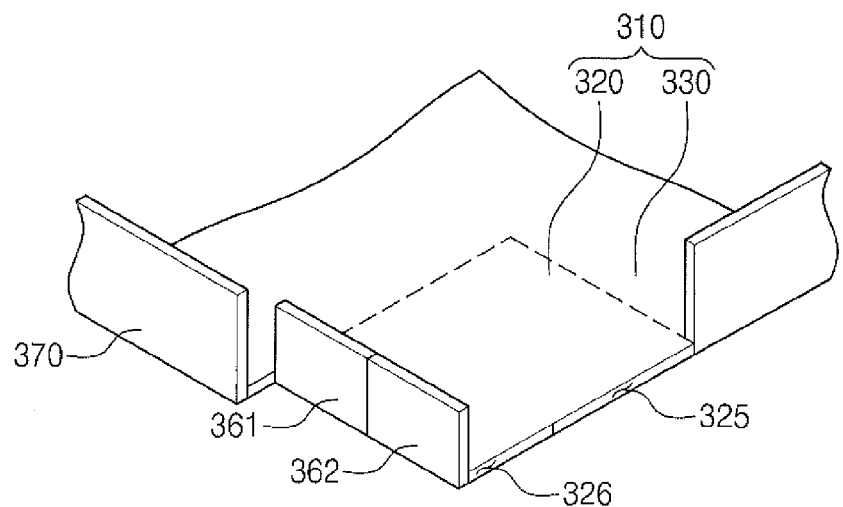
FIGS. 7A, 7B, and 7C are perspective views showing exemplary embodiments of various shapes of a bottom chassis included in a display device according to the invention.
Figure 7B:
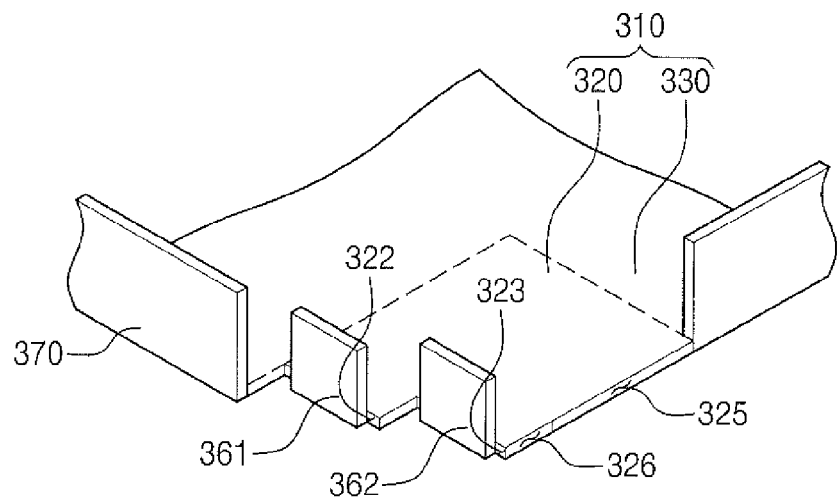
Figure 7C:
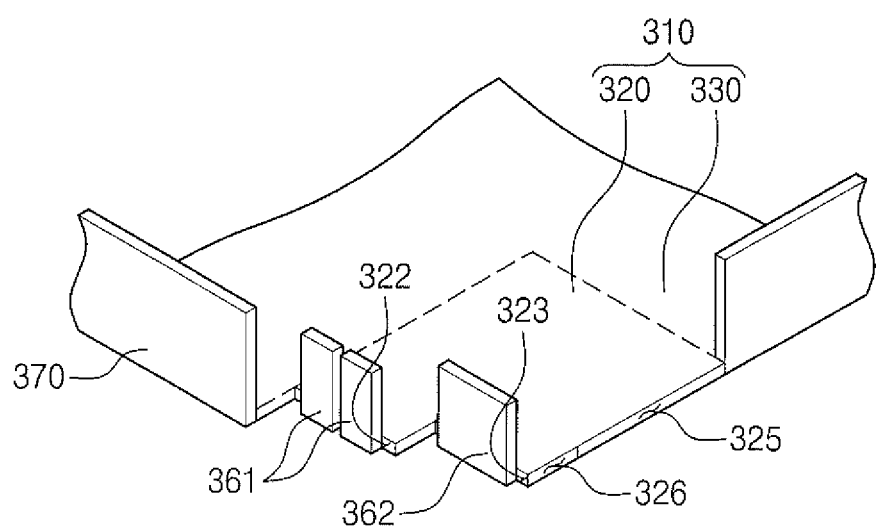

FIGS. 7A, 7B, and 7C are perspective views showing various shapes of a bottom chassis 300 included in a display device 10 according to exemplary embodiments of the invention.

Referring to FIGS. 4A, 4B, 7A, 7B, and 7C, the shortest distance (e.g., the distances d2 and d3 of FIG. 4A and the distance d3 of FIG. 4B) between the first bottom side surface 341 of the second bottom portion 330 and the first bottom side surface 321 of the first bottom portion 320 may be shorter than the shortest distance (e.g., the distance d1 of FIGS. 4A and 4B) between the first bottom side surface 341 and the second bottom side surface 342 of the second bottom portion 330 when viewed from a plan view.

Referring to FIGS. 4A, 4B, 7A, 7B, and 7C, the shortest distance (e.g., the distance d2 in FIGS. 4A and 4B) between the first sub-side wall 361 and the second side wall 370 connected perpendicularly to the first bottom side surface 341 of the second bottom portion 330 may be shorter than the shortest distance (e.g., the distance d3 in FIGS. 4A and 4B) between the second side wall 370 connected perpendicularly to the first bottom side surface 341 of the second bottom portion 330 and the second side wall 370 connected perpendicularly to the second bottom side surface 342 of the second bottom portion 330 when viewed from a plan view.

The shortest distance (e.g., the distance d3 in FIG. 4B) between the second sub-side wall 362 and the second side wall 370 connected perpendicularly to the first bottom side surface 341 of the second bottom portion 330 may also be shorter than the shortest distance (e.g., the distance d1 in FIG. 4B) between the second side wall 370 connected perpendicularly to the first bottom side surface 341 of the second bottom portion 330 and the second side wall 370 connected perpendicularly to the second bottom side surface 342 of the second bottom portion 330 when viewed from a plan view.

The shortest distance (e.g., the distance d2 in FIG. 4A) between the first sub-side wall 361 and the second side wall 370 connected perpendicularly to the first bottom side surface 341 of the second bottom portion 330 may be equal to the shortest distance (e.g., the distance d3 in FIG. 4A) between the second sub-side wall 362 and the second side wall 370 connected perpendicularly to the first bottom side surface 341 of the second bottom portion 330 when viewed from a plan view. However, the invention is not limited thereto. In other exemplary embodiments, the shortest distance between the first sub-side wall 361 and the second side wall 370 connected perpendicularly to the first bottom side surface 341 of the second bottom portion 330 may be different from the shortest distance between the second sub-side wall 362 and the second side wall 370 connected perpendicularly to the first bottom side surface 341 of the second bottom portion 330. In other words, the shortest distance between the first sub-side wall 361 and the second side wall 370 connected perpendicularly to the first bottom side surface 341 of the second bottom portion 330 may be longer or shorter than the shortest distance between the second sub-side wall 362 and the second side wall 370 connected perpendicularly to the first bottom side surface 341 of the second bottom portion 330.

Figure 8A:
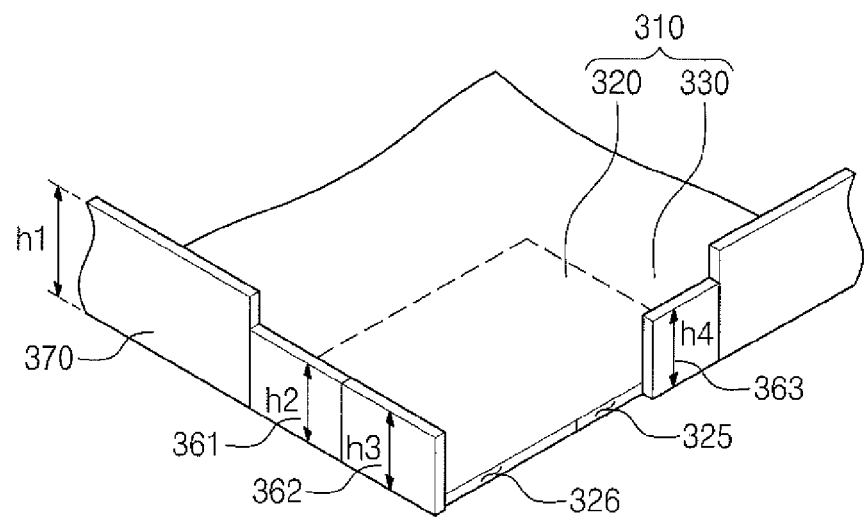
FIGS. 8A, 8B, and 8C are perspective views showing exemplary embodiments of various shapes of a bottom chassis included in a display device according to the invention.
Figure 8B:
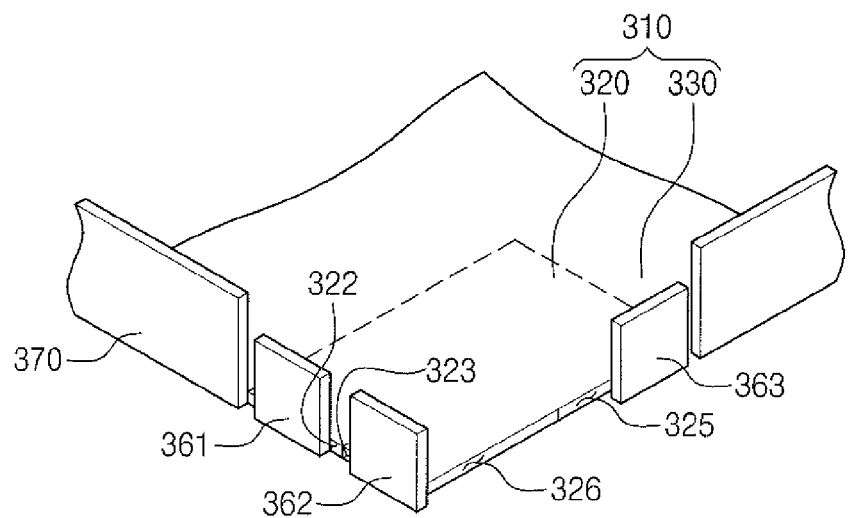
Figure 8C:
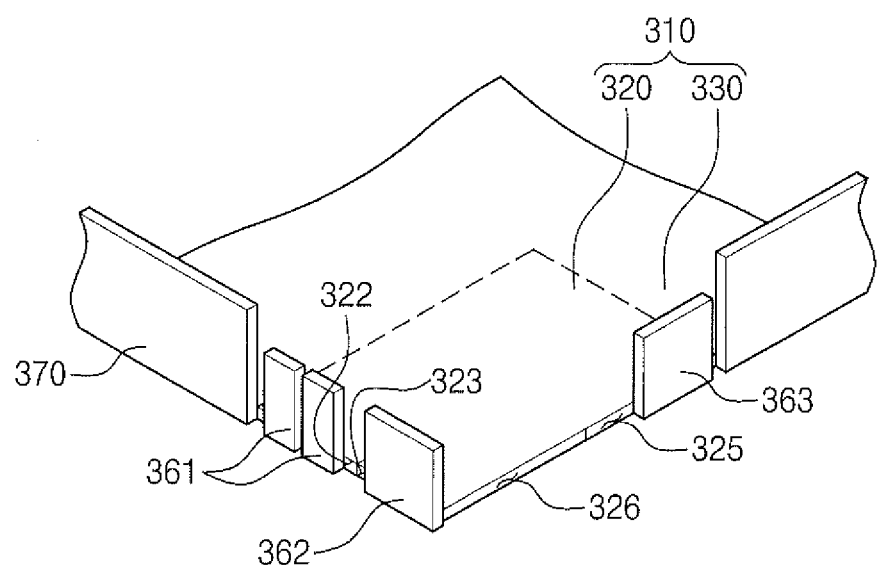

FIGS. 8A, 8B, and 8C are perspective views showing various shapes of a bottom chassis 300 included in a display device 10 according to exemplary embodiments of the invention.

Referring to FIGS. 1 to 3, 8A, 8B, and 8C, the first side wall 360 may further include a third sub-side wall 363 connected perpendicularly to at least a portion of the third sub-bottom side surface 325 of the first bottom portion 320. In an exemplary embodiment, the third sub-side wall 363 may extend from at least a portion of the third sub-bottom side surface 325 in the direction DR3 of FIG. 1. As shown in FIGS. 8A, 8B, and 8C, the third sub-side wall 363 may be connected perpendicularly to a portion of the third sub-bottom side surface 325. In an alternative exemplary embodiment, even though not shown in the drawings, the third sub-side wall 363 may be connected perpendicularly to an entire portion of the third sub-bottom side surface 325.

The third sub-side wall 363 may be connected to or spaced apart from one end of the second side wall 370. In exemplary embodiments, the third sub-side wall 363 may be connected to one end of the second side wall 370, as shown in FIG. 8A. In other exemplary embodiments, the third sub-side wall 363 may be spaced apart from one end of the second side wall 370, as shown in FIGS. 8B and 8C.

The number of the first sub-side wall 361 may be one, as shown in FIGS. 8A and 8B. In an alternative exemplary embodiment, the first sub-side wall 361 may be provided in plurality, as shown in FIG. 8C.

A height h4 of the third sub-side wall 363 may be lower than the height h1 of the second side wall 370. FIGS. 8A, 8B, and 8C show the third sub-side wall 363 having the height h4 lower than the height h1 of the second side wall 370 as an example. However, the invention is not limited thereto. In other exemplary embodiments, the height h4 of the third sub-side wall 363 may be equal to the height h1 of the second side wall 370.

Referring to FIGS. 3, 5A and 5B, the second bottom portion 330 may include the third bottom side surface 343 and the fourth bottom side surface 344. The fourth bottom side surface 344 of the second bottom portion 330 and the second bottom side surface 324 of the first bottom portion 320 may be collinear when viewed from a plan view. In this case, the shortest distance between the third bottom side surface 343 of the second bottom portion 330 and the second bottom side surface 324 of the first bottom portion 320 may be equal to the shortest distance (e.g., the distance d4 of FIGS. 5A and 5B) between the third bottom side surface 343 and the fourth bottom side surface 344 of the second bottom portion 330. In an alternative exemplary embodiment, as shown in FIG. 5A, the shortest distance (e.g., the distance d6) between the third bottom side surface 343 of the second bottom portion 330 and the fourth sub-bottom side surface 326 of the first bottom portion 320 may be shorter than the shortest distance (e.g., the distance d4) between the third bottom side surface 343 and the fourth bottom side surface 344 of the second bottom portion 330 when viewed from a plan view. In another exemplary embodiment, as shown in FIG. 5B, the shortest distance (e.g., the distance d6) between the third bottom side surface 343 of the second bottom portion 330 and the fourth sub-bottom side surface 326 may be shorter than the shortest distance (e.g., the distance d5) between the third bottom side surface 343 of the second bottom portion 330 and the third sub-bottom side surface 325 and the shortest distance (e.g., the distance d4) between the third bottom side surface 343 and the fourth bottom side surface 344 of the second bottom portion 330 when viewed from a plan view.

The shortest distance (e.g., the distance d5 of FIG. 5A or 5B) between the third bottom side surface 343 of the second bottom portion 330 and the third sub-bottom side surface 325 may be equal to or different from the shortest distance (e.g., the distance d6 of FIG. 5A or 5B) between the third bottom side surface 343 of the second bottom portion 330 and the fourth sub-bottom side surface 326. In FIG. 5B, the shortest distance (e.g., the distance d5) between the third bottom side surface 343 of the second bottom portion 330 and the third sub-bottom side surface 325 is longer than the shortest distance (e.g., the distance d6) between the third bottom side surface 343 of the second bottom portion 330 and the fourth sub-bottom side surface 326. However, the invention is not limited thereto. In other exemplary embodiments, the shortest distance (e.g., the distance d5) between the third bottom side surface 343 of the second bottom portion 330 and the third sub-bottom side surface 325 may be shorter than the shortest distance (e.g., the distance d6) between the third bottom side surface 343 of the second bottom portion 330 and the fourth sub-bottom side surface 326.

In other words, the shortest distance (e.g., the distance d5 of FIG. 5B) between the third sub-side wall 363 and the second side wall 370 connected perpendicularly to the third bottom side surface 343 may be shorter than the shortest distance (e.g., the distance d4 of FIG. 5B) between the second side wall 370 connected perpendicularly to the third bottom side surface 343 and the second side wall 370 connected to perpendicularly to the four bottom side surface 344 when viewed from a plan view.

Figure 9A:
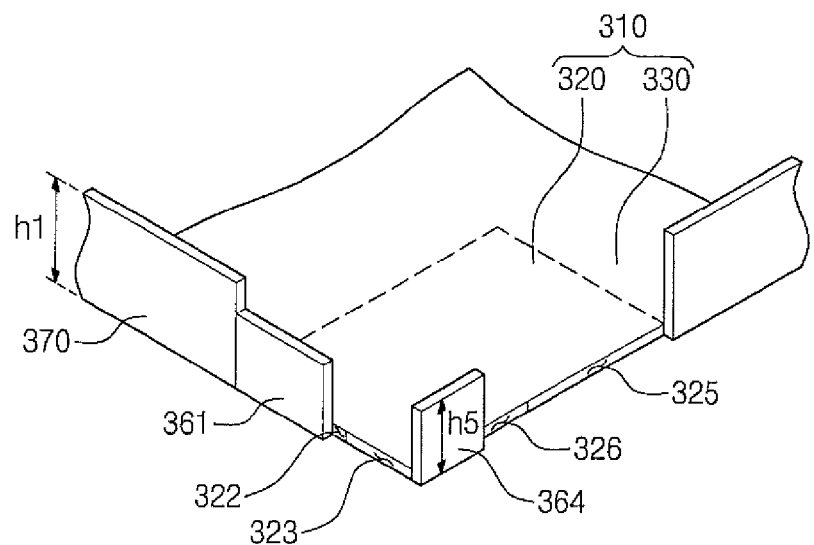
FIGS. 9A, 9B, and 9C are perspective views showing exemplary embodiments of various shapes of a bottom chassis included in a display device according to the invention.

In addition, the shortest distance between the third sub-side wall 363 and the second side wall 370 connected perpendicularly to the third bottom side surface 343 may be equal to the shortest distance between a fourth sub-side wall 364 of FIG. 9A connected perpendicularly to the fourth sub-bottom side surface 326 and the second side wall 370 connected perpendicularly to the third bottom side surface 343 when viewed from a plan view. However, the invention is not limited thereto. In other exemplary embodiments, the shortest distance between the third sub-side wall 363 and the second side wall 370 connected perpendicularly to the third bottom side surface 343 may be different from the shortest distance between the fourth sub-side wall 364 and the second side wall 370 connected perpendicularly to the third bottom side surface 343. In other words, the shortest distance between the third sub-side wall 363 and the second side wall 370 connected perpendicularly to the third bottom side surface 343 may be longer or shorter than shortest distance between the fourth sub-side wall 364 and the second side wall 370 connected perpendicularly to the third bottom side surface 343.

Figure 9B:
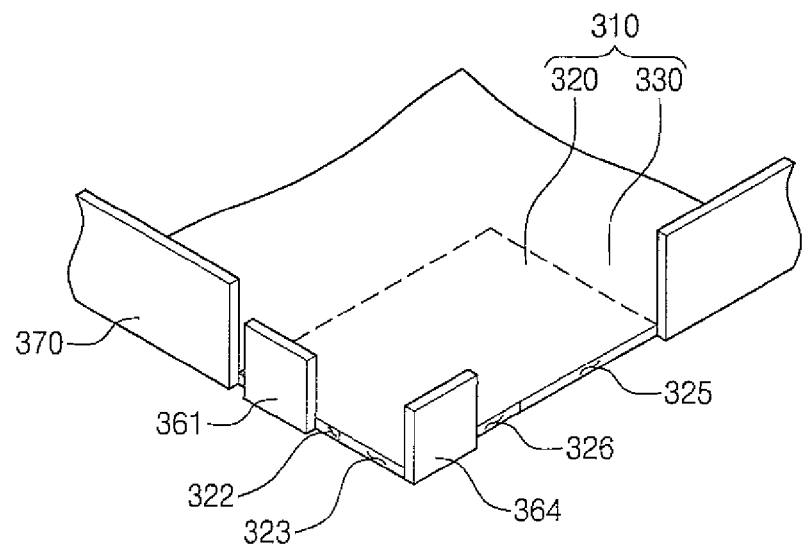
Figure 9C:
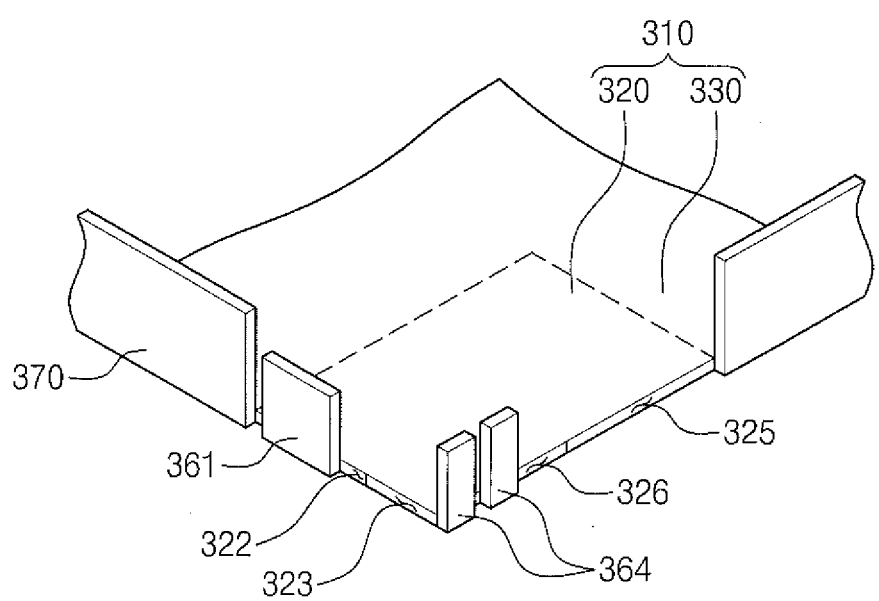

FIGS. 9A, 9B, and 9C are perspective views showing various shapes of a bottom chassis 300 included in a display device 10 according to exemplary embodiments of the invention.

Hereinafter, the display device 10 may include the first side wall 360 which includes the first sub-side wall 361 and the fourth sub-side wall 364 and exposes the second sub-bottom side surface 323 and the third sub-bottom side surface 325. Hereinafter, differences between the exemplary embodiment and the aforementioned embodiments will be mainly described to avoid redundancy of explanation.

Referring to FIGS. 9A, 9B, and 9C, the first side wall 360 may include the first sub-side wall 361 and the fourth sub-side wall 364. The first side wall 360 may expose the second sub-bottom side surface 323 and the third bottom side surface 325.

The first sub-side wall 361 may be connected perpendicularly to at least a portion of the first sub-bottom side surface 322. In an exemplary embodiment, the first sub-side wall 361 may extend from at least a portion of the first sub-bottom side surface 322 in the direction DR3 of FIG. 1.

The fourth sub-side wall 364 may be connected perpendicularly to at least a portion of the fourth sub-bottom side surface 326. In an exemplary embodiment, the fourth sub-side wall 364 may extend from at least a portion of the fourth sub-bottom side surface 326 in the direction DR3 of FIG. 1. The fourth sub-side wall 364 may be connected to a portion of the fourth sub-bottom side surface 326, as shown in FIGS. 9A, 9B, and 9C. In an alternative exemplary embodiment, even though not shown in the drawings, the fourth sub-side wall 364 may be connected to an entire portion of the fourth sub-bottom side surface 326.

As shown in FIG. 9A, the first sub-side wall 361 may be connected to one end of the second side wall 370. In an alternative exemplary embodiment, as shown in FIGS. 9B and 9C, the first sub-side wall 361 may be spaced apart from one end of the second side wall 370.

As shown in FIGS. 9A and 9B, the number of the fourth sub-side wall 364 may be one. In an alternative exemplary embodiment, the fourth sub-side wall 364 may be provided in plurality, as shown in FIG. 9C.

A height h5 of the fourth sub-side wall 364 may be lower than the height h1 of the second side wall 370. FIGS. 9A, 9B, and 9C show the fourth sub-side wall 364 having the height h5 lower than the height h1 of the second side wall 370 as an example. In an alternative exemplary embodiment, the height h5 of the fourth sub-side wall 364 may be equal to the height h1 of the second side wall 370.

When viewed from a plan view, the shortest distance between the fourth sub-side wall 364 and the second side wall 370 connected to the third bottom side surface 343 may be equal to the shortest distance between the second side wall 370 connected to the third bottom side surface 343 and the second side wall 370 connected to the fourth bottom side surface 344.

In an alternative exemplary embodiment, the shortest distance between the fourth sub-side wall 364 and the second side wall 370 connected to the third bottom side surface 343 may be shorter than the shortest distance between the second side wall 370 connected to the third bottom side surface 343 and the second side wall 370 connected to the fourth bottom side surface 344 when viewed from a plan view.

Referring to FIGS. 1 to 3, the display device according to exemplary embodiments may further include the mold frame 400 covering the side wall 350 of the bottom chassis 300.

The mold frame 400 may be coupled to the bottom chassis 300. In an exemplary embodiment, the mold frame 400 may include a latching protrusion (not shown). Since the latching protrusion (not shown) may be latched in a latching hole (not shown) defined in the bottom chassis 300, the mold frame 400 may be coupled to the bottom chassis 300. As a result, a coupling force between the mold frame 400 and the bottom chassis 300 may be improved.

Referring to FIGS. 7A to 7C and 9A to 9C, when the second and fourth sub-side walls 362 and 364 connected to the second and fourth sub-bottom side surfaces 323 and 326 are connected to each other, this structure (e.g., a ']'-shape) of the bottom chassis 300 may disturb the coupling of the bottom chassis 300 and the mold frame 400. Thus, the coupling force between the mold frame 400 and the side wall of the bottom chassis 300 may become weak. In an exemplary embodiment, defects may occur in the mold frame 400 having a structure coupled to the structure (e.g., the ']'-shape) of the side wall of the bottom chassis 300 when the mold frame 400 is fabricated using an injection molding process, for example.

However, according to embodiments of the invention, the side wall 350 of the bottom chassis 300 may expose at least one of the second sub-bottom side surface 323 and the fourth sub-bottom side surface 326, and thus, interference between the mold frame 400 and the bottom chassis 300 may be reduced or minimized to improve the coupling force between the mold frame 400 and the bottom chassis 300. In an exemplary embodiment, since the mold frame 400 does not have the structure (e.g., the ']'-shape) disturbing the coupling between the mold frame and the bottom chassis, defects may be reduced or minimized when the mold frame 400 is fabricated using the injection molding process.

According to embodiments of the invention, the display device may improve the coupling force between its components and may reduce defects.

While the invention have been described with reference to exemplary embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:
1. A display device comprising:
a display panel configured to display an image; and
a backlight unit which is disposed under the display panel to provide light to the display panel, and includes a bottom chassis including a bottom portion and a side wall,
the bottom portion of the bottom chassis comprising:
a first bottom portion disposed in a corner portion of the bottom portion and including a first bottom side surface, and a second bottom side surface perpendicular to the first bottom side surface; and
a second bottom portion connected to the first bottom portion,
the first bottom side surface of the first bottom portion comprising:
a first sub-bottom side surface connected to the second bottom portion; and
a second sub-bottom side surface connected or parallel to the first sub-bottom side surface and spaced apart from the second bottom portion,
the second bottom side surface of the first bottom portion comprising:
a third sub-bottom side surface connected to the second bottom portion; and
a fourth sub-bottom side surface spaced apart from the second bottom portion and connected perpendicularly to the second sub-bottom side surface,
wherein the side wall of the bottom chassis is connected perpendicularly to the bottom portion and exposes at least one of the second sub-bottom side surface and the fourth sub-bottom side surface wherein the side wall of the bottom chassis comprises:
a first side wall connected perpendicularly to the first bottom portion; and
a second side wall connected perpendicularly to the second bottom portion
wherein the first side wall comprises:
a first sub-side wall connected perpendicularly to at least a portion of the first sub-bottom side surface; and
a second sub-side wall connected perpendicularly to at least a portion of the second sub-bottom side surface of the first bottom portion, and
wherein,
the first sub-bottom side surface is spaced apart from the second sub-bottom side surface of the first bottom portion as viewed from a plan view, or
the third sub-bottom side surface of the first bottom portion is spaced apart from the fourth sub-bottom side surface as viewed from a plan view.

2. The display device of claim 1, wherein the first bottom portion is provided in plurality in the bottom portion.

3. The display device of claim 1, wherein each of heights of the first and second sub-side walls is lower than a height of the second side wall.

4. The display device of claim 1, wherein a height of the first sub-side wall is equal to a height of the second sub-side wall.

5. The display device of claim 1, wherein the first sub-side wall is spaced apart from the second side wall.

6. The display device of claim 1, wherein the first sub-side wall is spaced apart from the second sub-side wall.

7. The display device of claim 1, wherein at least one of the first sub-side wall and the second sub-side wall is provided in plurality.

8. The display device of claim 1, wherein the first side wall further comprises:
a third sub-side wall connected perpendicularly to at least a portion of the third sub-bottom side surface of the first bottom portion.

9. The display device of claim 8, wherein a height of the third sub-side wall is lower than a height of the second side wall.

10. The display device of claim 8, wherein the third sub-side wall is spaced apart from the second side wall.

11. The display device of claim 8, wherein the third sub-side wall is provided in plurality.

12. The display device of claim 1, wherein the first side wall comprises:
a fourth sub-side wall connected to perpendicularly to at least a portion of the fourth sub-bottom side surface,
wherein the first side wall exposes the second sub-bottom side surface and the third sub-bottom side surface of the first bottom portion.

13. The display device of claim 12, wherein a height of the fourth sub-side wall is lower than a height of the second side wall.

14. The display device of claim 12, wherein the fourth sub-side wall is provided in plurality.

15. The display device of claim 1, further comprising:
a mold frame which covers at least a portion of the side wall of the bottom chassis and is disposed between the display panel and the backlight unit to support the display panel.

16. A display device comprising:
a display panel configured to display an image; and
a backlight unit which is disposed under the display panel to provide light to the display panel, and includes a bottom chassis including a bottom portion and a side wall,
the bottom portion of the bottom chassis comprising:
a first bottom portion disposed in a corner portion of the bottom portion and including a first bottom side surface, and a second bottom side surface perpendicular to the first bottom side surface; and
a second bottom portion connected to the first bottom portion,
the first bottom side surface of the first bottom portion comprising:
a first sub-bottom side surface connected to the second bottom portion; and
a second sub-bottom side surface connected or parallel to the first sub-bottom side surface and spaced apart from the second bottom portion,
the second bottom side surface of the first bottom portion comprising:
a third sub-bottom side surface connected to the second bottom portion; and
a fourth sub-bottom side surface spaced apart from the second bottom portion and connected perpendicularly to the second sub-bottom side surface,
wherein the side wall of the bottom chassis is connected perpendicularly to the bottom portion and exposes at least one of the second sub-bottom side surface and the fourth sub-bottom side surface,
wherein the side wall of the bottom chassis comprises:
a first side wall connected perpendicularly to the first bottom portion; and
a second side wall connected perpendicularly to the second bottom portion wherein the first side wall comprises:
a first sub-side wall connected perpendicularly to at least a portion of the first sub-bottom side surface; and
a second sub-side wall connected perpendicularly to at least a portion of the second sub-bottom side surface of the first bottom portion,
wherein the second bottom portion comprises:
a first bottom side surface parallel to the first bottom side surface of the first bottom portion; and
a second bottom side surface parallel to the first bottom side surface of the second bottom portion,
wherein a shortest distance between the first bottom side surface of the second bottom portion and the first bottom side surface of the first bottom portion is shorter than a shortest distance between the first and second bottom side surfaces of the second bottom portion as viewed from a plan view.

17. A display device comprising:
a display panel configured to display an image; and
a backlight unit which is disposed under the display panel to provide light to the display panel, and includes a bottom chassis including a bottom portion and a side wall,
the bottom portion of the bottom chassis comprising:
a first bottom portion disposed in a corner portion of the bottom portion and including a first bottom side surface, and a second bottom side surface perpendicular to the first bottom side surface; and
a second bottom portion connected to the first bottom portion,
the first bottom side surface of the first bottom portion comprising:

a first sub-bottom side surface connected to the second bottom portion; and a second sub-bottom side surface connected or parallel to the first sub-bottom side surface and spaced apart from the second bottom portion, the second bottom side surface of the first bottom portion comprising:

a third sub-bottom side surface connected to the second bottom portion; and a fourth sub-bottom side surface spaced apart from the second bottom portion and connected perpendicularly to the second sub-bottom side surface, wherein the side wall of the bottom chassis is connected perpendicularly to the bottom portion and exposes at least one of the second sub-bottom side surface and the fourth sub-bottom side surface, wherein the side wall of the bottom chassis comprises:

a first side wall connected perpendicularly to the first bottom portion; and a second side wall connected perpendicularly to the second bottom portion wherein the first side wall comprises:

a first sub-side wall connected perpendicularly to at least a portion of the first sub-bottom side surface; and a second sub-side wall connected perpendicularly to at least a portion of the second sub-bottom side surface of the first bottom portion, wherein the second bottom portion comprises:

a third bottom side surface parallel to the second bottom side surface of the first bottom portion; and a fourth bottom side surface parallel to the third bottom side surface, wherein a shortest distance between the third bottom side surface of the second bottom portion and the second bottom side surface of the first bottom portion is shorter than a shortest distance between the third and fourth bottom side surfaces of the second bottom portion as viewed from a plan view.

* * * * *